(12) United States Patent
Dickey et al.

(10) Patent No.: US 10,637,074 B2
(45) Date of Patent: Apr. 28, 2020

(54) FLEXIBLE BATTERY WITH LIQUID METAL ELECTRODE

(71) Applicant: Microsoft Technology Licensing, LLC, Redmond, WA (US)

(72) Inventors: Michael David Dickey, Raleigh, NC (US); James David Holbery, Bellevue, WA (US); Collin Brittain Eaker, Forest City, NC (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 197 days.

(21) Appl. No.: 15/654,604

(22) Filed: Jul. 19, 2017

(65) Prior Publication Data

US 2019/0027762 A1    Jan. 24, 2019

(51) Int. Cl.
| | | |
|---|---|---|
| *H01M 6/00* | (2006.01) | |
| *H01M 6/04* | (2006.01) | |
| *H01M 12/08* | (2006.01) | |
| *H01M 12/06* | (2006.01) | |
| *C01G 15/00* | (2006.01) | |
| *H01M 2/02* | (2006.01) | |
| *H01M 4/36* | (2006.01) | |
| *H01M 10/00* | (2006.01) | |

(52) U.S. Cl.
CPC .......... *H01M 6/045* (2013.01); *C01G 15/006* (2013.01); *H01M 2/0275* (2013.01); *H01M 4/36* (2013.01); *H01M 10/00* (2013.01); *H01M 12/06* (2013.01); *H01M 12/08* (2013.01); *H01M 2300/0005* (2013.01); *H01M 2300/0014* (2013.01)

(58) Field of Classification Search
CPC .... C01G 15/006; H01M 2/0275; H01M 4/36; H01M 6/045; H01M 2300/014; H01M 12/06
See application file for complete search history.

(56) References Cited

U.S. PATENT DOCUMENTS

| | | |
|---|---|---|
| 5,462,821 A | 10/1995 | Onoue et al. |
| 8,841,014 B1 | 9/2014 | Deshpande et al. |
| 2007/0048594 A1* | 3/2007 | Oh ...................... H01M 8/0232 429/483 |

(Continued)

FOREIGN PATENT DOCUMENTS

| | | |
|---|---|---|
| CN | 102802346 A | 11/2012 |
| JP | 2011198495 A | 10/2011 |

OTHER PUBLICATIONS

"International Search Report and Written Opinion Issued in PCT Application No. PCT/US2018/034812", dated Aug. 7, 2018, 15 Pages.

(Continued)

*Primary Examiner* — Cynthia H Kelly
*Assistant Examiner* — Monique M Wills
(74) *Attorney, Agent, or Firm* — Alleman Hall Creasman & Tuttle LLP

(57) ABSTRACT

An electrochemical energy-storage cell comprises a flexible positive electrode and a flexible negative electrode including a gallium-based liquid metal dispersed on a flexible wire mesh. The electrochemical energy-storage cell also comprises a membrane having one face in contact with the flexible positive electrode and an opposing face in contact with the flexible negative electrode.

20 Claims, 4 Drawing Sheets

(56) References Cited

U.S. PATENT DOCUMENTS

| | | | |
|---|---|---|---|
| 2012/0009491 A1 | 1/2012 | Friesen et al. | |
| 2012/0301784 A1* | 11/2012 | Yano | B82Y 30/00 |
| | | | 429/213 |
| 2013/0143113 A1 | 6/2013 | Stauffer | |
| 2015/0132648 A1* | 5/2015 | Inoue | H01M 4/134 |
| | | | 429/218.1 |
| 2015/0155559 A1* | 6/2015 | Zimmerman | H01M 4/364 |
| | | | 429/213 |
| 2018/0166735 A1* | 6/2018 | Busacca | H01M 4/02 |
| 2019/0036182 A1* | 1/2019 | McKay | H01M 4/0447 |

OTHER PUBLICATIONS

Yu, et al., "Materials, Mechanics, and Patterning Techniques for Elastomer-Based Stretchable Conductors", In Journal of Micromachines, vol. 8, Issue 1, Dec. 27, 2016, 37 pages.

Kim, et al., "Interfacing Liquid Metals with Stretchable Metal Conductors", In Journal of Applied Material and Interfaces, vol. 7, Issue 15, Apr. 2, 2015, 2 pages.

Kettlgruber, et al., "Intrinsically stretchable and rechargeable batteries for self-powered stretchable electronics", In Journal of Materials Chemistry A, vol. 1, No. 18, Mar. 14, 2013, pp. 5439-5776.

Harrop, Peter, "Lithium and gallium compounds in the new electronics and electrics", http://www.printedelectronicsworld.com/articles/4762/lithium-and-gallium-compounds-in-the-new-electronics-and-electrics, Published on: Sep. 28, 2012, 5 pages.

Dickey, et al., "Researchers use liquid metal to create wires that stretch eight times their original length", https://phys.org/news/2012-12-liquid-metal-wires-length.html, Published on: Dec. 18, 2012, 4 pages.

Dickey, et al., "Eutectic Gallium-Indium (EGaIn): A Liquid Metal Alloy for the Formation of Stable Structures in Microchannels at Room Temperature", In Journal of Advanced Functional Materials, vol. 18, Issue 7, Apr. 11, 2008, 3 pages.

Liu, et al., "Flexible and Stretchable Energy Storage: Recent Advances and Future Perspectives", In Journal of Advanced Materials, vol. 29, Issue 1, Jan. 4, 2017, 51 pages.

Yu, et al., "Effects of gallium on electrochemical discharge behavior of Al—Mg—Sn—In alloy anode for air cell or water-activated cell", In Journal of Transactions of Nonferrous Metals Society of China, vol. 25, Issue 11, Nov. 2015, pp. 3747-3752.

Ahmed, Enas M. "Hydrogel: Preparation, characterization, and applications: A review", Journal of Advanced Research. vol. 6, Issue 2, Mar. 2015, pp. 105-121. Available at: http://www.sciencedirect.com/science/article/pii/S2090123213000969.

Sun., et al., "Highly stretchable and tough hydrogels", Nature 489, 133-136, Sep. 6, 2012 Available at: https://www.nature.com/nature/journal/v489/n7414/full/nature11409.html.

\* cited by examiner

FLEXIBLE BATTERY WITH LIQUID METAL ELECTRODE

BACKGROUND

Many electronic devices are powered by electrochemical batteries. An electrochemical battery may be engineered to minimize ohmic loss during charge and discharge, to optimize energy-storage capacity, and/or to retain such capacity over numerous discharge cycles. In pursuit of these objects, electrochemical battery technology has advanced markedly in recent years. However, the basic structural features of electrochemical batteries have evolved more slowly and may not fully meet the demands of modern consumer electronics.

SUMMARY

Examples are disclosed that relate to an electrochemical energy-storage cell. The electrochemical energy-storage cell comprises a flexible positive electrode and a flexible negative electrode including a gallium-based liquid metal dispersed on a flexible wire mesh. The electrochemical energy-storage cell also comprises a membrane having one face in contact with the flexible positive electrode and an opposing face in contact with the flexible negative electrode.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
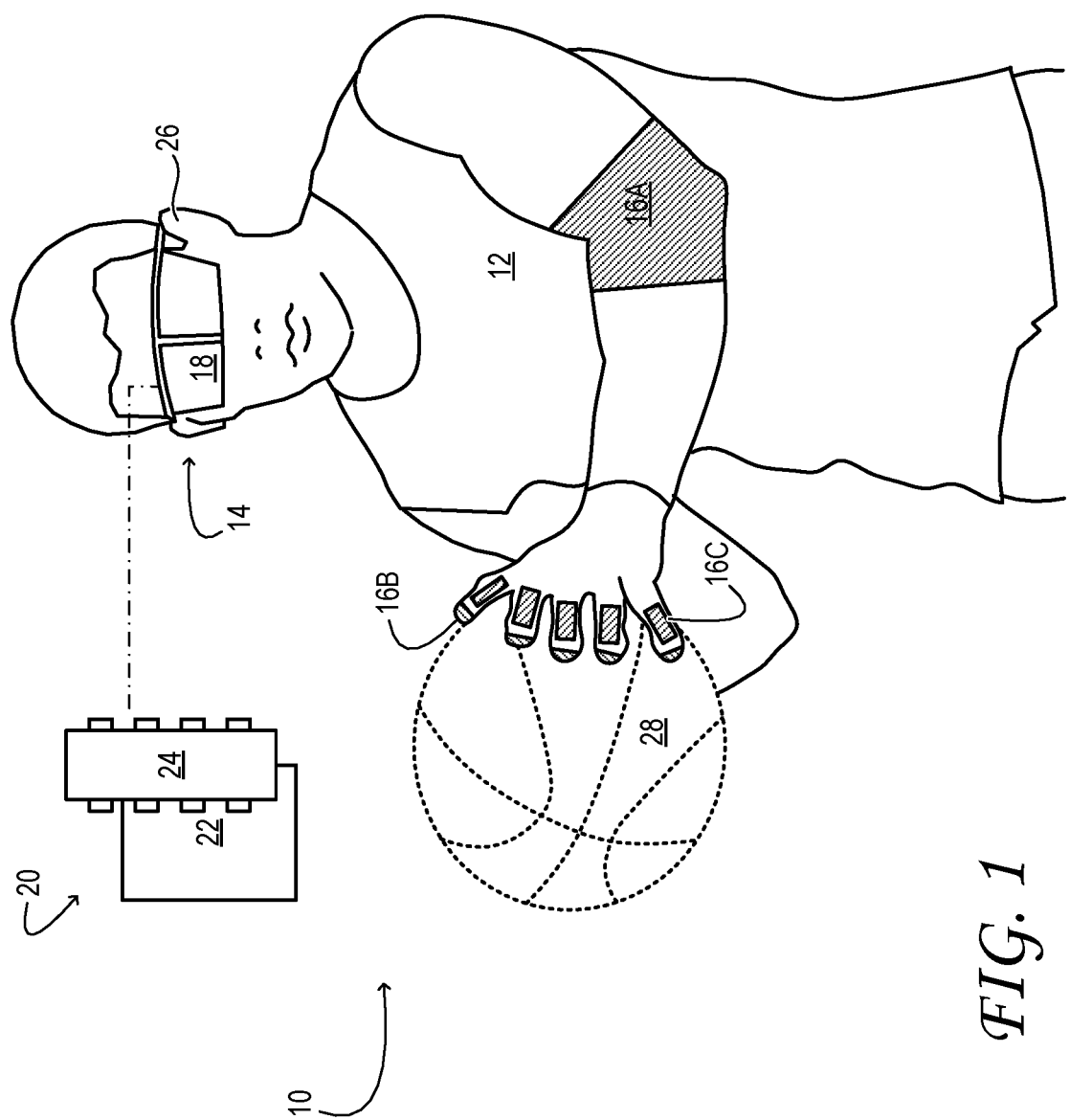
FIG. 1 shows aspects of an example game system.

This disclosure is presented by way of example and with reference to the drawing figures listed above. Components, process steps, and other elements that may be substantially the same in one or more of the figures identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

FIG. 1 shows aspects of an example game system 10, which provides a non-limiting implementation context for this disclosure. The game system is configured to present a lifelike virtual reality (VR) to user 12. Game system 10 includes a headset 14 and other wearable electronic devices 16 (device 16A, 16B, etc.). The headset includes a binocular near-eye display 18 configured to display virtual imagery in the field of view of the user. Electronic signal encoding the virtual display imagery is sent to the near-eye display via on-board computer 20. The on-board computer includes at least one processor 22 and associated electronic memory device 24. Leveraging communications componentry of headset 14 (not shown in the drawings), on-board computer 20 may be coupled communicatively to one or more off-board computers, on a network.

Each of the wearable electronic devices 16 of game system 10 may be configured to augment the user's VR experience. For example, a wearable electronic device may include an electromechanical actuator configured to provide a lifelike contact sensation responsive to user interaction with the virtual environment. The electromechanical actuator may be configured to provide a mechanical, resistive contact sensation in response to detection of 'contact' between the body of user 12 and a virtual display object projected into a field of view of the user. The contact sensation may be provided whenever the hand of intersects virtual display object 28, for instance. To this end, the electromechanical actuator may be coupled communicatively to computer 20. The computer may be configured to host a model of the virtual environment and track the position of the user's hand through real-world coordinates of that model. When contact between the hand and a solid virtual object is indicated, the actuator is energized and pressure is applied; the actuator is de-energized when contact is no longer indicated. In other examples, a wearable electronic device 16 may include a sensor—e.g., a flexion sensor to be worn on an articulable body part, such as an elbow. The flexion sensor may be communicatively coupled to computer 20, so that the computer 'knows' the extent to which the user's elbow is flexed during VR game play.

As shown in FIG. 1, some wearable electronic devices 16 of game system 10 may be configured to conform to the user's body. Other devices, such as headset 14, may be substantially rigid overall, but may include one or more body-conforming components—e.g., a fastening band (not shown in the drawings) which conforms to the back of the user's head. The band may include functional electronics and/or a power supply, as described further below.

In general, body-conforming devices and components may be configured with a degree of flexibility, to ensure user comfort and positive contact with the associated body part. They may be engineered, moreover, to withstand various forms of mechanical strain associated with flexion on the user's body, and with repeated cycles of being put on and taken off the user's body. In particular, a wearable electronic device or component of system 10 may include a power-supply engineered for flexibility and mechanical robustness in challenging use scenarios.

Figure 2:
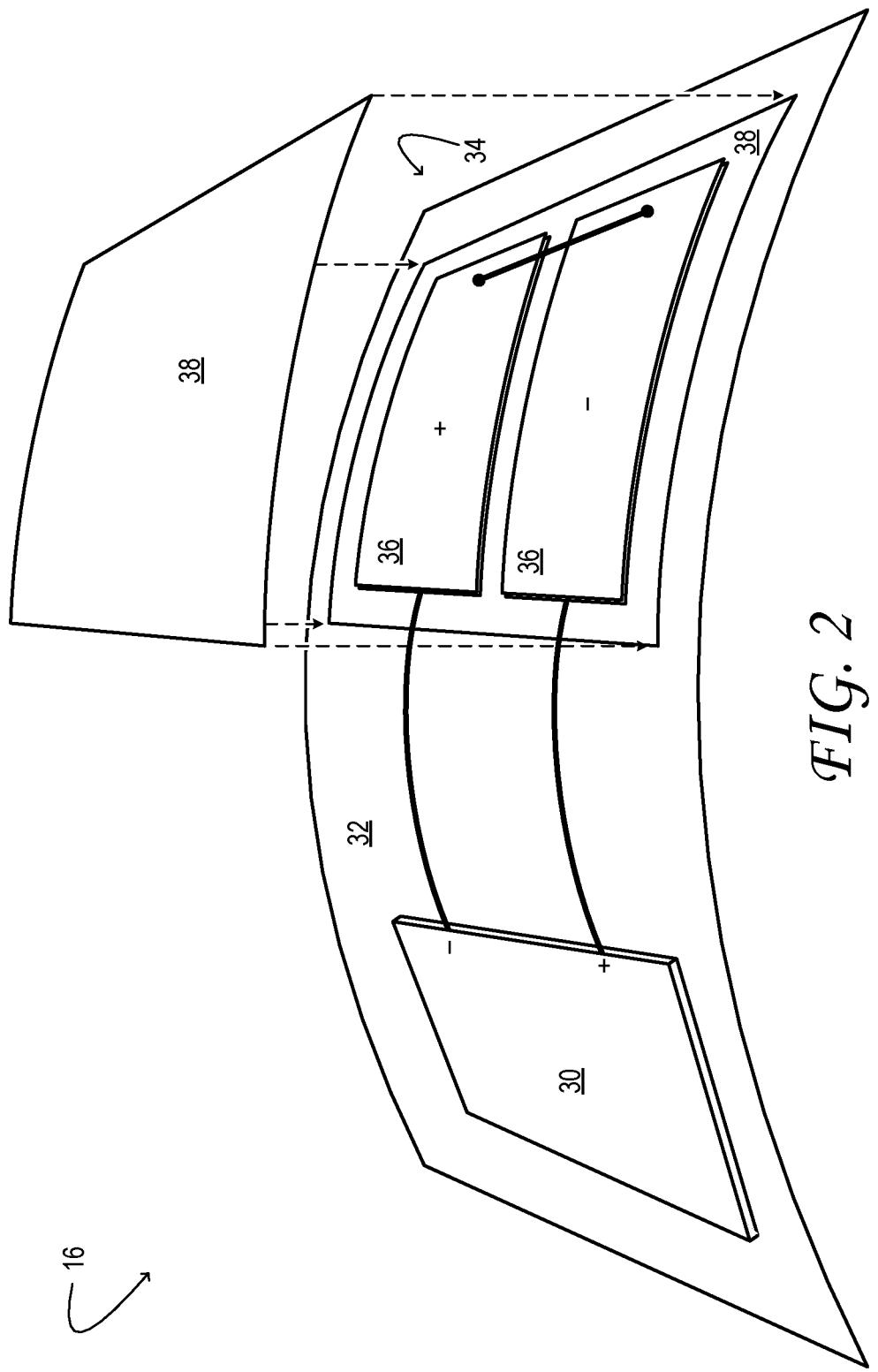
FIG. 2 shows aspects of an example electronic device powered by an electrochemical battery.

FIG. 2 shows aspects of an example electronic device 16. The electronic device includes an electronic circuit 30 formed on a bendable or fully flexible printed circuit board (PCB) 32. The PCB may incorporate polyimide-flex, silicone, or stretch-to-flex materials, as examples. The electronic circuit may include a transducer, such as an electromechanical actuator, loudspeaker, or microphone. The electronic circuit also or alternatively may include a sensor, a display, an illuminator, or a communication module such as a WiFi or Bluetooth radio. The electronic circuit also or alternatively may include a logic system such as a computer or microcontroller with associated computer memory. The electronic circuit may include any of these components, separately or in combination, and may further include virtually any other component that, due to its small size or flexibility, preserves the desired overall flexibility of electronic device 16.

Electronic circuit 30 of electronic device 16 is operatively coupled to electrochemical battery 34, and configured to draw power therefrom. The electrochemical battery includes one or more electrochemical energy-storage cells 36, which are sealed by a flexible encapsulant 38. In this manner, the flexible encapsulant may be configured to enclose the entire electrochemical battery structure. In the example shown in FIG. 2, the flexible encapsulant includes an upper and a lower portion joinable to form a seal.

In some embodiments, flexible encapsulant 38 is comprised of a urethane or silicone polymer (e.g., polyurethane, polydimethylsiloxane). The polymer may be molded into any desired shape, may be highly elastomeric, and may afford some protection from ingress or egress of moisture. Furthermore, a suitably configured silicone envelope may be appreciably permeable to oxygen, and may be configured to admit oxygen from air outside battery 34 to the positive electrodes of electrochemical energy-storage cells 36. This feature may be used to an advantage in examples where air-cathode positive electrodes (vide infra) are employed. In the embodiment shown in FIG. 2, the plurality of electrochemical energy-storage cells are connected in series. In other embodiments, the cells may be connected in parallel, or in any series-parallel combination.

Figure 3:
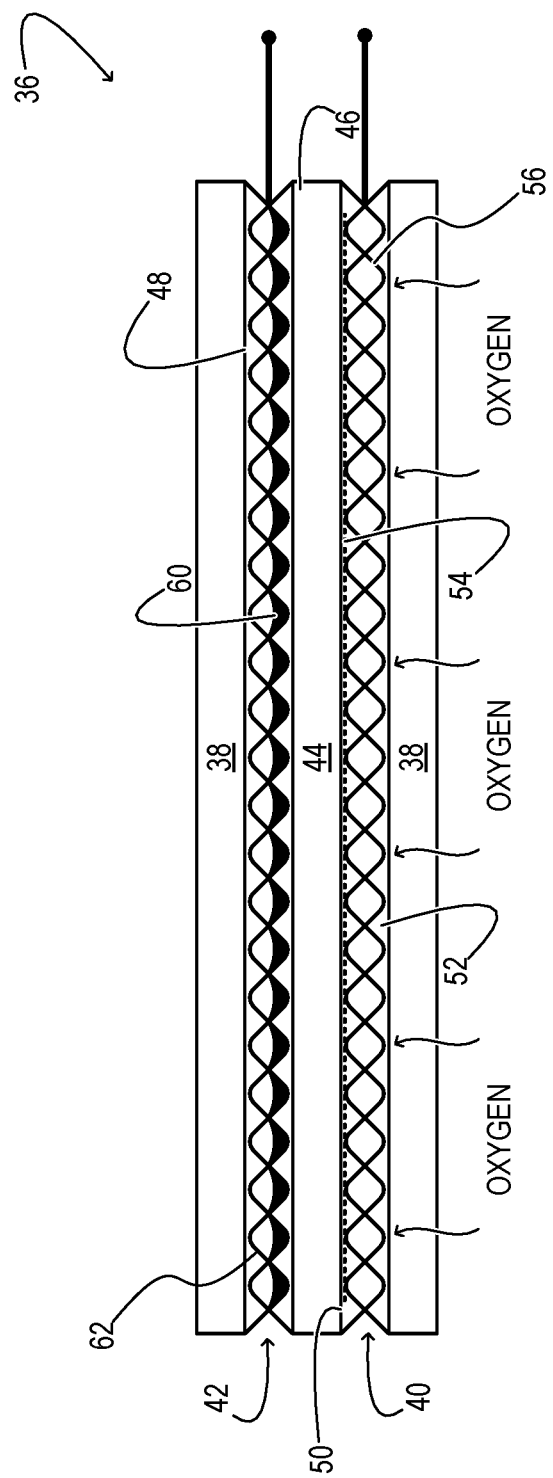
FIGS. 3 and 4 show aspects of example electrochemical energy-storage cells of an electrochemical battery.

FIG. 3 shows aspects of an example electrochemical energy-storage cell 36. The electrochemical energy-storage cell includes a flexible positive electrode 40, a flexible negative electrode 42, and a membrane 44 sandwiched between the flexible positive electrode and the flexible negative electrode.

In electrochemical energy-storage cell 36, liquid electrolyte 46 contacts membrane 44. The liquid electrolyte may contact one or both faces of the membrane, for example, providing ionic conduction through the membrane. In more particular examples, the liquid electrolyte may permeate or wick into the pores of the membrane, such that the electrolyte on one side of the membrane communicates fluidically (through the pore structure) with the electrolyte on the other side of the membrane. In this manner, the membrane-sorbed electrolyte is held in contact with the positive electrode 40 and negative electrode 42, providing a path of ionic conduction between the electrodes. The liquid electrolyte may comprise an aqueous electrolyte in some examples. This feature leverages the hydrophobicity of a silicone-based encapsulant 38. In other examples, nonaqueous electrolytes based on organic solvents (propylene carbonate, ethylene carbonate, N,N-dimethylformamide, etc.) may be used. In some implementations, the liquid electrolyte may be a hydroxide electrolyte. Examples include aqueous lithium hydroxide, sodium hydroxide, and potassium hydroxide, among others, at concentrations ranging from 0.5 to 5 molar. In other implementations, the liquid electrolyte may be an acid electrolyte—aqueous sulfuric, phosphoric, or trifluoroacetic acid, for example, at concentrations ranging from 0.5 to 5 molar.

Membrane 44 has one face 48 in contact with flexible positive electrode 40 and an opposing face 50 in contact with the flexible negative electrode 42. The composition of the membrane is not particularly limited. In some implementations, a paper membrane may be used. Other suitable membranes include any hydrogel having a high capacity to sorb the liquid electrolyte 46. Examples include hydrogels based on agarose, polyacrylamide, polyethyleneoxide, polyvinylpyrrolidone, methylcellulose, carboxymethylcellulose, polyvinyl alcohol, (hydroxyethyl)methacrylate, or poly(2-acrylamido-2-methyl-1-propanesulfonic acid) (polyAMPS). In addition, 'double networks' of two different hydrogel materials may be used to form exceptionally robust, stretchable hydrogel composites. Double networks may be particularly suited for electrochemical energy-storage cells subject to mechanical strain. In still other examples, membrane 44 may comprise a polyelectrolyte membrane, such as a proton-exchange membrane (useful under acidic conditions), or a hydroxide-exchange membrane under basic conditions). In some implementations, a polyelectrolyte membrane may be used in lieu of liquid electrolyte 46. In other implementations, a polyelectrolyte membrane may be used in addition to the liquid electrolyte (e.g., in configurations where extreme permselectivity is desired).

In the example shown in FIG. 3, flexible positive electrode 40 is an air-cathode configured to support the reduction of aerobic oxygen under basic conditions,

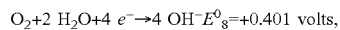
$O_2 + 2 H_2O + 4 e^- \rightarrow 4 OH^- E^0_B = +0.401$ volts, or under acidic conditions,

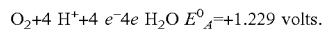
$O_2 + 4 H^+ + 4 e^- 4e H_2O \; E^0_A = +1.229$ volts.

Accordingly, flexible positive electrode 40 may have a distributed geometry that extends into the areas of contact between air pocket 52 and the electrolyte-containing membrane 44. Further, the flexible positive electrode may include, particularly in areas of contact with the membrane, a dispersed oxygen-reduction catalyst 54. Some example oxygen-reduction catalysts include finely divided noble metals, such as platinum, palladium, and rhodium, or other finely divided metals such as nickel or silver.

Where an air cathode is used as positive electrode 40, the material portion of the positive electrode may take the form of a flexible mesh 56, which preserves the overall flexibility of electrochemical energy-storage cell 36 and of the battery or device in which it resides. The air cathode may offer an advantage in applications that require a high open-circuit voltage, but may not require a very high current density.

Flexible positive electrodes 40 that differ from the air-cathode configuration are also envisaged. In the example electrochemical energy-storage cell 436 of FIG. 4, flexible mesh 56 of positive electrolyte 440 is arranged in contact with a dispersed oxidizer 58 in the form of a paste. The oxidizer is one that remains insoluble (or sparingly soluble) in the electrolyte during typical operating and storage conditions. This arrangement may also provide substantial electrode flexibility. Example dispersed oxidizers suitable for positive electrode 440 may include manganese dioxide and oxides of trivalent nickel and cobalt.

Figure 4:
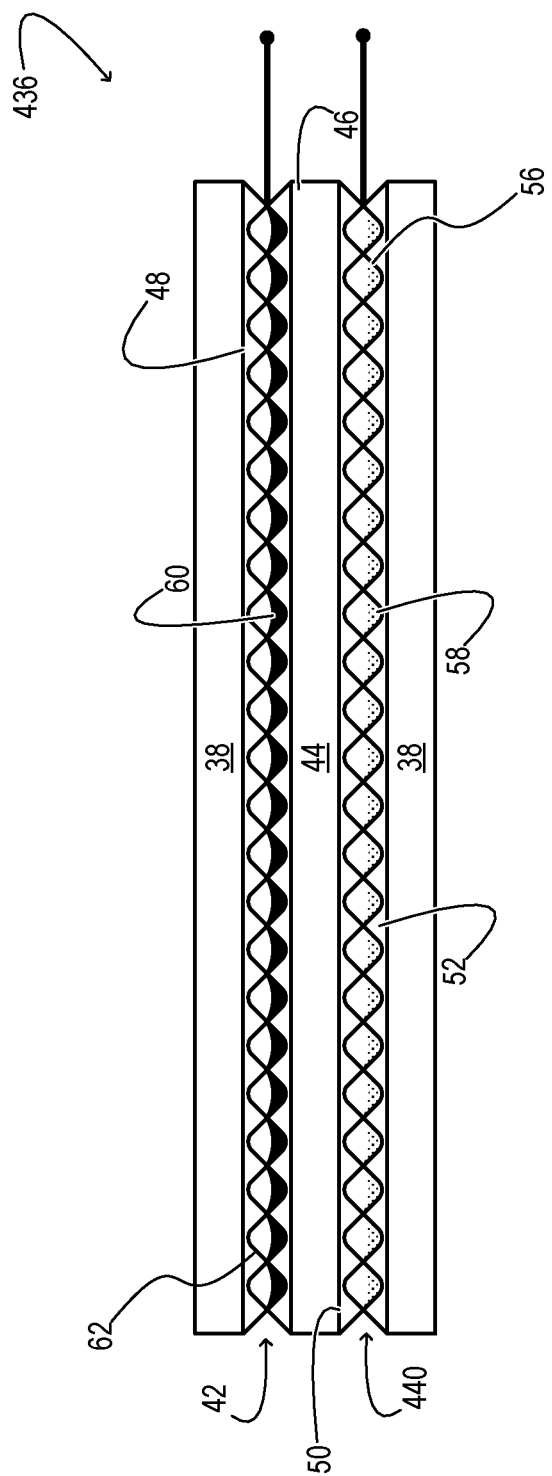

Continuing in FIGS. 3 and 4, flexible negative electrode 42 includes a gallium-based liquid metal 60 dispersed on a flexible wire mesh 62. In some examples, the gallium-based liquid metal includes one or more of indium and tin—e.g., eutectic gallium-indium and other gallium-indium alloys, galinstan, and various other alloys comprising gallium and tin, with or without indium. Gallium, typically, is the most electroactive element in such alloys. In basic solution, gallium is oxidized to gallate,

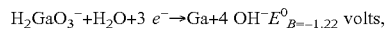
$H_2GaO_3^- + H_2O + 3 e^- \rightarrow Ga + 4 OH^- E^0_B = -1.22$ volts, which may exist in other hydration states—e.g., $Ga(OH)_4^-$, depending on conditions. In acidic solution,

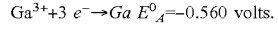
$Ga^{3+} + 3 e^- \rightarrow Ga \; E^0_A = -0.560$ volts.

One potential advantage of providing the gallium reductant in the form of a liquid metal is that the negative electrode may retain the full flexibility of its supporting structure. However, a liquid metal may have a tendency to bead up to minimize its surface area. This effect would negatively impact the current density available from a liquid metal electrode, due to the loss of electroactive surface area.

Thus, flexible wire mesh 62 may be selected so as to have a desirable wetting property with respect to liquid metal 60, such as one which is actively effectively wet by the liquid metal, but at least somewhat resistant to corrosive alloying by the liquid metal. Materials fitting this description are referred to herein as 'liquid-metal wettable'. Thus, the flexible wire mesh may include wires of any liquid-metal wettable metal—e.g., copper, silver, or nickel. In other examples, the flexible wire mesh may include wires of a base metal, or even a plastic (e.g., nylon), which support a dispersion or coating of a liquid-metal wettable material. A thin film of a liquid-metal wettable material on a non-mesh substrate (e.g., a flexible elastomer, or paper) is also envisaged.

In some implementations, electrochemical energy-storage cell 36 is intended to be a 'primary cell', supplied in a fully charged state and offering one discharge cycle. In other implementations, the electrochemical energy-storage cell is intended to be a 'secondary cell' capable of being recharged from a discharged state and offering numerous discharge cycles. To enable recharge, the product of the gallium oxidation remains within the confines of the cell, and membrane 44 may be selected to prevent the product from crossing through the membrane. Recharge efficiency may also be enhanced by including, in liquid electrolyte 46, a surfactant and/or plating additive selected to discourage oxide formation on flexible wire mesh 62 and/or the surface of liquid metal 60 as the liquid metal is electrochemically grown on the mesh during recharge.

At positive electrode 40, rechargeability depends on providing efficient egress of the oxygen produced when positive current (traditional convention) is applied to the positive electrode. Furthermore, the voltage applied to the positive electrode may be controlled during recharge so as to avoid oxidation of any oxygen-reduction catalyst dispersed on the positive electrode. Likewise, the catalyst itself may be selected for resistance to electrochemical oxidation.

Another example provides an electrochemical energy-storage cell comprising a flexible positive electrode; a flexible negative electrode including a gallium-based liquid metal dispersed on a flexible wire mesh; and a membrane having one face in contact with the flexible positive electrode and an opposing face in contact with the flexible negative electrode.

In some implementations, the electrochemical energy-storage cell further comprises a liquid electrolyte making intimate contact with the membrane. In some implementations, the liquid electrolyte is an aqueous electrolyte. In some implementations, the liquid electrolyte is an hydroxide electrolyte. In some implementations, the liquid electrolyte is an acid electrolyte. In some implementations, the flexible positive electrode is an air cathode. In some implementations, the flexible positive electrode includes a dispersed oxygen-reduction catalyst. In some implementations, the flexible positive electrolyte includes a dispersed oxidizer. In some implementations, the membrane is a polyelectrolyte membrane. In some implementations, the membrane includes a hydrogel. In some implementations, the flexible wire mesh is a copper wire mesh. In some implementations, the flexible wire mesh includes a metal dispersion. In some implementations, the gallium-based liquid metal includes one or more of indium and tin.

Another example provides an electrochemical battery comprising a plurality of electrochemical energy-storage cells, each cell comprising a flexible positive electrode, a flexible negative electrode including a gallium-based liquid metal dispersed on a flexible wire mesh, and a membrane having one face in contact with the flexible positive electrode and an opposing face in contact with the flexible negative electrode; and a flexible encapsulant configured to seal the plurality of electrochemical energy-storage cells.

In some implementations, the flexible encapsulant comprises one or more silicone and a urethane. In some implementations, the flexible encapsulant is configured to admit oxygen from air outside the battery to the flexible positive electrode. In some implementations, the plurality of electrochemical energy-storage cells are connected in series.

Another example provides a flexible electronic device comprising an electronic circuit; and coupled operatively to the electronic circuit, one or more electrochemical energy-storage cells comprising a flexible positive electrode, a flexible negative electrode including a gallium-based liquid metal dispersed on a flexible wire mesh, and a membrane having one face in contact with the flexible positive electrode and an opposing face in contact with the flexible negative electrode.

In some implementations, the flexible electronic device further comprises a flexible encapsulant configured to seal the one or more electrochemical energy-storage cells. In some implementations, the flexible electronic device is configured to be worn on a human body.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An electrochemical energy-storage cell comprising:
 a flexible positive electrode;
 a flexible negative electrode including a flexible wire mesh configured to discourage beading of a gallium-based liquid metal, and a dispersion of the gallium-based liquid metal at least partially coating the flexible wire mesh; and
 a membrane having one face in contact with the flexible positive electrode and an opposing face in contact with the flexible negative electrode.

2. The electrochemical energy-storage cell of claim 1 further comprising a liquid electrolyte in contact with the membrane.

3. The electrochemical energy-storage cell of claim 2 wherein the liquid electrolyte is an aqueous electrolyte.

4. The electrochemical energy-storage cell of claim 2 wherein the liquid electrolyte is a hydroxide electrolyte.

5. The electrochemical energy-storage cell of claim 2 wherein the liquid electrolyte is an acid electrolyte.

6. The electrochemical energy-storage cell of claim 1 wherein the flexible positive electrode is an air cathode.

7. The electrochemical energy-storage cell of claim 1 wherein the flexible positive electrode includes a dispersed oxygen-reduction catalyst.

8. The electrochemical energy-storage cell of claim 1 wherein the flexible positive electrolyte includes a dispersed oxidizer.

9. The electrochemical energy-storage cell of claim 1 wherein the membrane is a polyelectrolyte membrane.

10. The electrochemical energy-storage cell of claim 1 wherein the membrane includes a hydrogel.

11. The electrochemical energy-storage cell of claim 1 wherein the flexible wire mesh is a copper wire mesh.

12. The electrochemical energy-storage cell of claim 1 wherein the flexible wire mesh includes a metal dispersion.

13. The electrochemical energy-storage cell of claim 1 wherein the gallium-based liquid metal includes one or more of indium and tin.

14. An electrochemical battery comprising:
a plurality of electrochemical energy-storage cells, each cell comprising a flexible positive electrode, a flexible negative electrode including a flexible wire mesh configured to discourage beading of a gallium-based liquid metal, a dispersion of the gallium-based liquid metal at least partially coating the flexible wire mesh, and a membrane having one face in contact with the flexible positive electrode and an opposing face in contact with the flexible negative electrode; and
a flexible encapsulant configured to seal the plurality of electrochemical energy-storage cells.

15. The electrochemical battery of claim 14 wherein the flexible encapsulant comprises one or more of silicone and a urethane.

16. The electrochemical battery of claim 14 wherein the flexible encapsulant is configured to admit oxygen from air outside the battery to the flexible positive electrode.

17. A flexible electronic device comprising:
an electronic circuit; and
coupled operatively to the electronic circuit, one or more electrochemical energy-storage cells comprising a flexible positive electrode, a flexible negative electrode including a flexible wire mesh configured to discourage beading of a gallium-based liquid metal, a dispersion of the gallium-based liquid metal at least partially coating the flexible wire mesh, and a membrane having one face in contact with the flexible positive electrode and an opposing face in contact with the flexible negative electrode.

18. The flexible electronic device of claim 17 further comprising a flexible encapsulant configured to seal the one or more electrochemical energy-storage cells.

19. The flexible electronic device of claim 17 wherein the flexible electronic device is configured to be worn on a human body.

20. The electrochemical energy-storage cell of claim 1, wherein the electrochemical energy-storage cell is configured to electrochemically oxidize elemental gallium from the gallium-based liquid metal at the flexible negative electrode.

* * * * *